United States Patent [19]
Davies

[11] 4,066,203
[45] Jan. 3, 1978

[54] METHOD FOR ELECTRICALLY AND HYDRAULICALLY CONNECTING A WATER-COOLED CONDUCTOR

[75] Inventor: David Peter Davies, Columbus, Ohio

[73] Assignee: McGraw-Edison Company, Elgin, Ill.

[21] Appl. No.: 761,446

[22] Filed: Jan. 21, 1977

[51] Int. Cl.² .......................................... B23K 31/02
[52] U.S. Cl. ............................ 228/180 R; 228/246; 228/249
[58] Field of Search ................ 228/178, 179, 180 R, 228/132, 133, 212, 245, 246, 249; 310/52-54, 59

[56] References Cited

U.S. PATENT DOCUMENTS

| | | | |
|---|---|---|---|
| 2,033,122 | 3/1936 | Cornell | 228/246 |
| 3,185,872 | 5/1965 | Weissheimer | 310/54 |
| 3,510,700 | 5/1970 | Grinchenko | 310/54 |
| 3,614,493 | 10/1971 | Collings | 310/54 |
| 3,633,266 | 1/1972 | Taylor | 228/132 X |
| 3,742,122 | 6/1973 | Blavos | 174/88 R X |
| 3,955,110 | 5/1976 | Karlen | 310/54 |
| 3,980,910 | 9/1976 | Steinebronn | 310/71 |

Primary Examiner—Donald G. Kelly
Attorney, Agent, or Firm—Jon Carl Gealow; Thomas E. McDonald; Ronald J. LaPorte

[57] ABSTRACT

A method of electrically and hydraulically connecting a conductor bar having a plurality of hollow water-cooled conductors involves compressing the conductor bar and shims of brazing material in a connector clip formed of a pair of mating clip members. Brazing shims (strips and bands) are placed in desired positions, and then the components are heated and hydraulically compressed. The conductor bar and brazing material assembly is sized for a tight fit in one dimension, but oversized in another dimension so that compression results in a desired distribution of the molten brazing material. During compression, the clip members are secured from relative motion, other than displacement toward one another, and air is passed through the hollow conductors to prevent the accumulation of brazing material in the open ends thereof. In addition to the clip members, the connector device includes a water inlet member with a stem that is inserted between and brazed to the clip members after the compression step.

8 Claims, 7 Drawing Figures

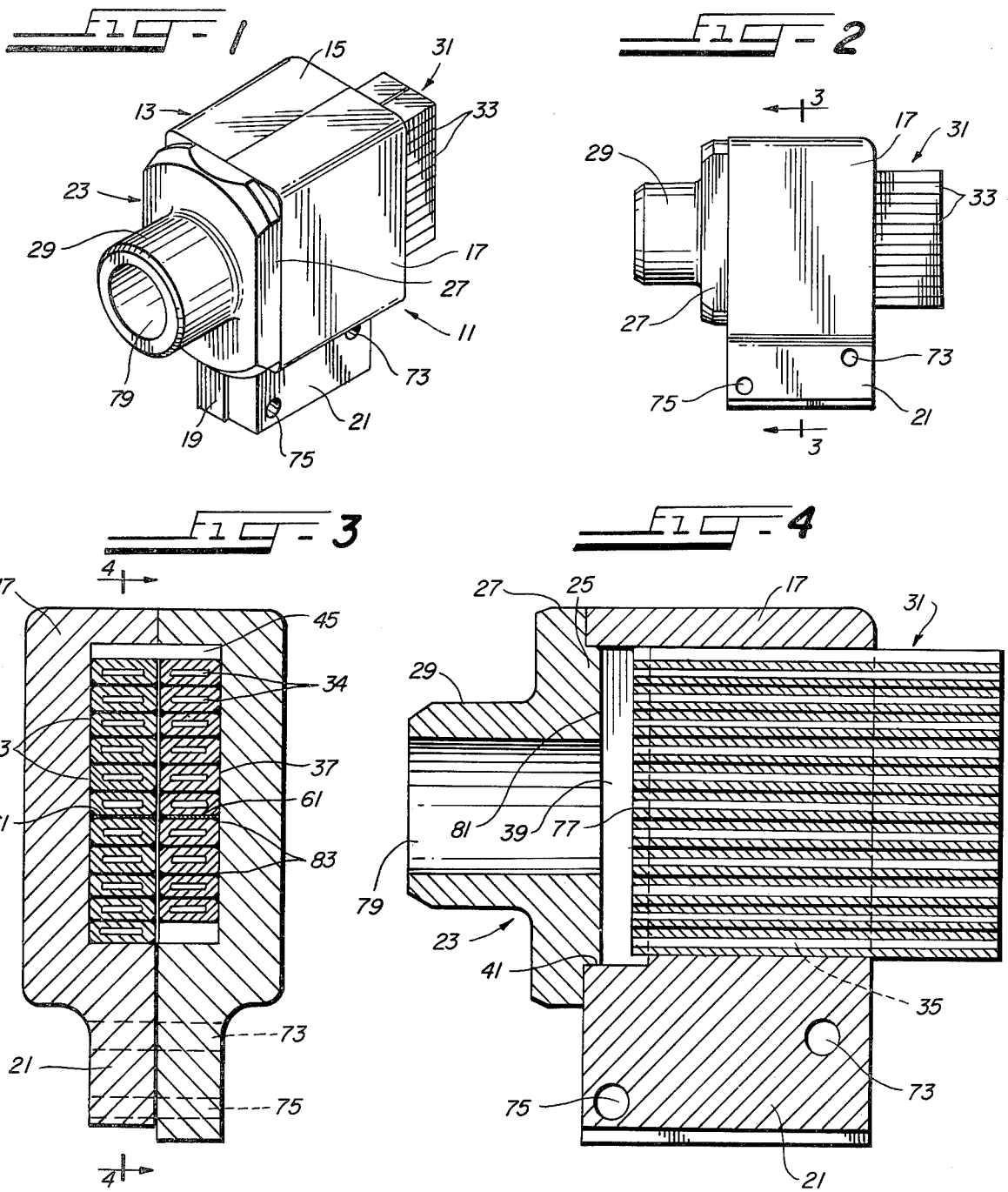

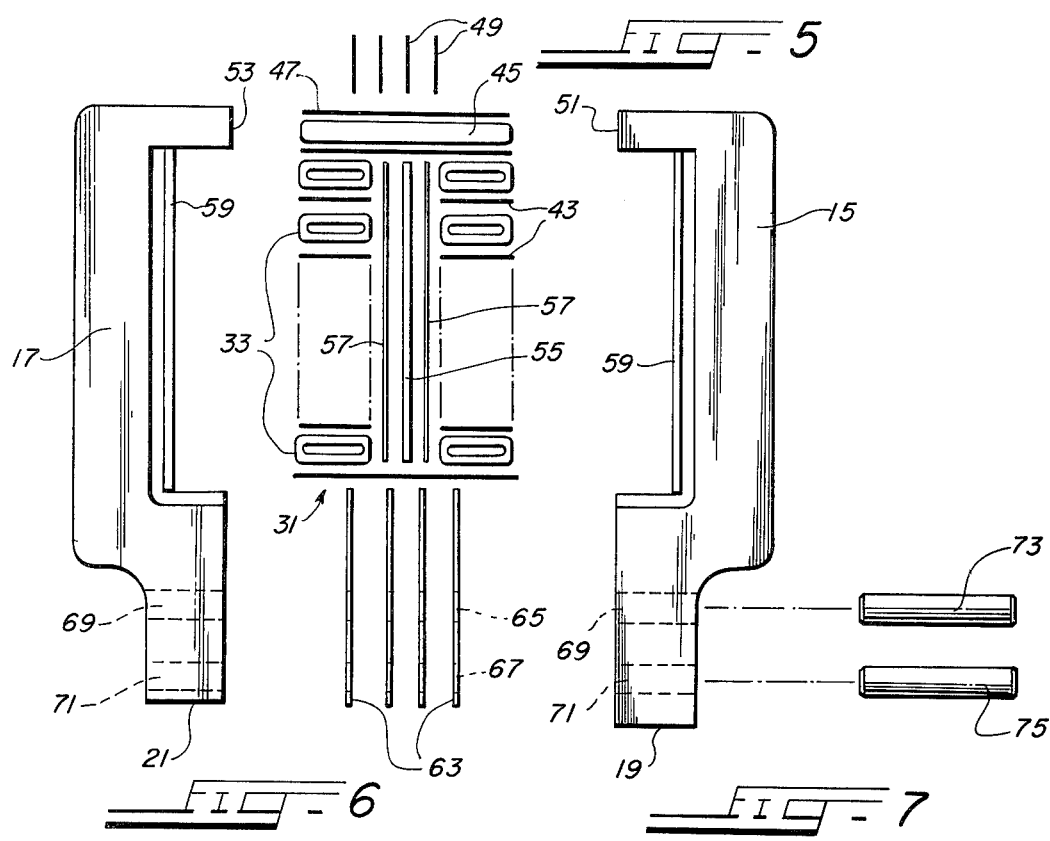

METHOD FOR ELECTRICALLY AND HYDRAULICALLY CONNECTING A WATER-COOLED CONDUCTOR

BACKGROUND OF THE INVENTION

1. Field of the Invention

The present invention relates generally to a method and connector device to provide a good electrical and hydraulic connection for a water-cooled conductor, and more specifically, the present invention relates to a method and connector device for providing a good electrical and hydraulic connection for turbogenerator stator bars formed from a plurality of hollow water-cooled conductors.

2. Description of the Prior Art

In large turbogenerators, excessive heating can occur due to the very large currents that are involved. Accordingly, hollow conductors are utilized so that water may be passed therethrough to remove the undesired heat. Although different shapes may be employed, the most common assembly of water-cooled conductors involves a pair of rows of generally rectangular conductors formed into a generally rectangular conductor bar. These conductor bars are then employed as the windings for the extremely large turbogenerators.

Cooling water for the hollow conductors is normally introduced at the end turn area of the turbogenerator windings. A conventional practice is to utilize a connector to which the end of a conductor bar is brazed, with provision for inserting water into the open end of the hollow conductors. The end turns are completed by electrically connecting appropriate connectors.

One type of connector is essentially in the form of a hollow box. The conductor bar is inserted partially into the connector box and brazed to the box. Water is then inserted into the other end of the box to be passed through the open end of the hollow conductors. In order to make such an arrangement work, the brazing of the conductor bar to the box should be such as to provide a strong mechanical joint, a continuous electrically conductive path, and a water-tight seal. While prior art approaches have frequently been able to provide the strong mechanical joint, the electrical, and especially the hydraulic, aspects of these brazed joints have frequently been deficient.

Prior art brazed joints have conventionally been achieved by feeding the brazing material along the conductors toward the open ends of the hollow conductors. Such an approach relies upon the capillary action of the brazing material. Dependence upon the capillary action results in a number of problems. First of all, in order to keep the brazing material moving along the conductors, it is necessary to utilize relatively high temperatures to achieve brazing material flow along even the relatively limited length which may be achieved. In addition, the brazing material tends to flow to the smaller gaps or spaces, and hence it is difficult to get enough brazing material in the relatively larger spaces, such as at the rounded corners of the conductors. Still further, in order to achieve the desired electrical and hydraulic characteristics, both the box and the conductor bar must be constructed to fairly tight tolerances (a total tolerance in the order of 0.001 or 0.002 inch is required), which is extremely difficult to achieve with a conductor bar. Therefore, many prior art braze joints exhibit poor electrical characteristics and a tendency toward porosity with respect to the cooling water. Inasmuch as the failure of a large turbogenerator can result in the loss of many tens of thousands of dollars worth of electrical power each day that the turbogenerator is not operating, the failure of a brazed joint is very serious.

SUMMARY OF THE INVENTION

The method and connector device of the present invention alleviate many of the problems of prior art devices and permit the establishment of a brazed joint that is not only strong mechanically, but which also obviates many of the electrical and hydraulic deficiencies of prior art conductor bar connections. Not only is a better braze joint achieved, but the manufacturing process is also simplified with the resultant lower costs.

To achieve these results, applicant employs a pair of mating clip members, each of which has a conductor bar receiving chamber portion formed at one end and a larger water cavity portion formed at the other end. Shims or strips of brazing material are placed between adjacent hollow conductors, which are positioned in two parallel rows about a central web of conducting material. In addition, bands of the brazing material are located in the conductor bar receiving chamber portions of the clip members, as well as on either side of the central web of conductive material. The bands of brazing material have a thickness such that when they are added to the cross-sectional width of the conductor bar the total width is greater than the width of the conductor bar receiving chamber formed by joining the clip members. By some suitable approach, such as the use of a packing shim of conducting material having an appropriate thickness, the cross-sectional length of the rows of hollow conductors in the conductor bar is established to provide a snug fit of the conductor bar in the conductor bar receiving chamber. Accordingly, it may be seen that the tolerances of the conductor bar and the clip members are considerably less demanding than with prior art devices, as compensations may be easily provided for any discrepancies.

A water inlet member has a stem that is partially inserted into the water cavity portion of one of the clip members. The conductor bar also extends slightly beyond the conductor bar receiving chamber into the water cavity, but is spaced from the opposing end of the stem of the water inlet member to permit water to accumulate in this portion of the water cavity. The water inlet member also has a flange that is approximately the shape and size of the clip members when joined, as well as a neck with a central passage which extends on through the flange and the stem to pass water into the water cavity.

With the conductor bar and the associated shims of brazing material positioned as indicated, the other clip member is brought adjacent the first clip member and the clip members and conductor bar are heated to the melting temperature of the brazing material. Dowels formed of conducting material are placed in appropriate openings formed in legs extending from the clip members. These dowels prevent relative motion between the clip members, except for displacement of the clip members toward one another, during the time that the brazing material is in a molten state. After the brazing material is heated to its melting temperature, the clip members are hydraulically compressed so that they are forced toward one another until they are joined. This action causes the brazing material to be distributed throughout the assembly, including the formation of reservoirs or pools at relatively large spaces, such as the rounded corners of the conductors, to form the desired braze joint.

During the time that the clip members are being hydraulically compressed, air may be passed through the hollow conductors to blow away any brazing material that tends to flow into the open ends of the conductors. In this fashion, the build up or accumulation of brazing materials in the hollow conductors is prevented.

By this approach, a very desirable braze joint is formed by the compression of the conductor bar and brazing material between the clip members to provide a uniform distribution of brazing material throughout the braze joint. After the joining of the clip members, the stem of the water inlet member is inserted into the water cavity and brazed in place to provide for the introduction of water into the water cavity.

Since variations and tolerances are easily compensated, and manufacturing process is made much simpler and less costly. In addition, the process may be achieved at lower temperatures than with prior art devices. These advantages are all supplementary to the production of a braze joint that is a considerable improvement electrically and hydraulically over the braze joints of the prior art.

These and other objects, advantages and features of this invention will hereinafter appear, and for purposes of illustration, but not of limitation, an exemplary embodiment of the subject invention is shown in the appended drawing.

BRIEF DESCRIPTION OF THE DRAWING

FIG. 1 is a perspective view of a connection made pursuant to the present invention.

FIG. 2 is a side elevational view of the connection of FIG. 1.

FIG. 3 is an enlarged cross-sectional view taken along line 3—3 of FIG. 2.

FIG. 4 is a cross-sectional view taken along line 4—4 of FIG. 3.

FIG. 5 is an exploded enlarged view of the connection of FIG. 1 prior to final assembly.

FIG. 6 is a perspective view showing the electrical interconnection of two connections of the type illustrated in FIG. 1 to complete the end turn of a turbogenerator.

FIG. 7 is a cross-sectional view taken along line 7—7 of FIG. 6.

DETAILED DESCRIPTION OF THE PREFERRED EMBODIMENT

With reference to FIG. 1 an electrical and hydraulic connection 11 constructed in accordance with the present invention is illustrated. A connector device 13 has a pair of mating clip members 15 and 17, each of which has an extending leg section 19 or 21, respectively. A water inlet member 23 has a stem 25 (FIG. 4), a flange 27 and a neck 29. A conductor bar 31 is formed from a plurality of hollow water-cooled conductors 33. Any appropriate number, odd or even, of hollow conductors may be employed, this preferred embodiment illustrating the use of twenty-one hollow conductors.

In the cross-sectional view of FIG. 4, it may be seen that the clip member 17 has a conductor bar receiving chamber portion 35. When clip member 15, and its corresponding conductor bar receiving chamber portion, is joined with clip member 17, the conductor bar receiving chamber 37 (FIG. 3) is established. Similarly, it may be seen that clip member 17 has a water cavity portion 39 which, when joined with the corresponding water cavity portion of clip member 15, forms the water cavity 41. The water cavity portion 39 is formed slightly deeper than the conductor bar receiving portion 35, so that the water cavity is larger than the conductor bar receiving chamber 37.

By utilization of FIGS. 3, 4 and 5, the method of forming the connection for the conductor bar may now be followed. As seen in FIG. 5 shims or strips of brazing material 43 are positioned between the hollow conductors 33. This brazing material may be any suitable composition, such as a standard alloy of silver, phosphorus and copper sold by Handy and Harman under the trademark "SILFOS". The shims or strips 43 may be of any desired thickness, the preferred embodiment disclosed herein employing strips of 0.005 inch thickness.

A pad of conductive material 45 is located at one end of the conductor bar 31. This conductive pad 45 may be formed of any suitable conductive material, such as an oxygen-free high conductivity copper. Pad 45 has a shim 47 of spacing material on either side thereof. These shims 47 may also have a thickness of 0.005 inch. Additional shims 49 are located above pad 45 to form a brazed connection between top edges 51 and 53 of clip members 15 and 17, respectively.

The two rows of hollow conductors 33 are separated by a conductive web 55. Web 55 may be any suitable electrically conductive material, such as copper. On either side of the web 55 there is positioned a shim or band of conductive material 57. These bands would normally be thicker than the strips of brazing material separating the hollow conductors, for example on the order of 0.020 inch. Other bands or shims of brazing material 59 are located in the conductor bar receiving chamber portions of the clip members 15 and 17. Bands 59 would normally be thicker than the bands 57, in this preferred embodiment being approximately 0.040 inch. The thickness of the bands 57 and 59 added to the cross-sectional width of the conductor bar 31 should be greater than the width of the conductor bar receiving chamber 37, so that upon compression of the clip members 15 and 17 the molten brazing material will be forced throughout the chamber 37 to provide a uniform brazed joint.

The cross-sectional length of a conductor bar 31 should be adjusted to snuggly fit within the conductor bar receiving chamber 37. Any appropriate type of adjustment will suffice, such as varying the thickness of the strips or shims 43 or the thickness of the conductive pad 45. However, it has been found preferable to make this adjustment by the utilization of a packing shim 61. Packing shim 61 is formed of conductive material and has a thickness such as to provide the desired snug fit of conductor bar 31 in conductive bar receiving chamber 37.

Additional shims of brazing material 63 are positioned between the legs 19 and 21 of clip members 15 and 17 in order to provide a good braze joint between these sections of the clip members. It should be noted that these shims 63 are provided with openings 65 and 67 to align with openings 69 and 71 in legs 19 and 21. The purpose of these openings 65, 67, 69 and 71 is to receive the dowels 73 and 75. Dowels 73 and 75 serve to prevent relative motion between clip members 15 and 17 during the time that these members are being forced toward one another under hydraulic pressure. Of course, the one motion that the dowels 73 and 75 do not interfere with is the displacement of the clip members 15 and 17 toward one another.

After the shims have been positioned, the conductor bar 31 is placed in the conductor bar receiving chamber portion of one of the clip members 15 or 17, as may be seen in FIG. 4. An end 77 of conductor bar 31 is extended slightly into the water cavity 41, in order to minimize the amount of brazing material that will tend to flow into the open end of the hollow conductors 33. At the other end, the water inlet member 23 will have its stem 25 inserted into the water cavity 41, where it should fit snuggly. Flange 27 abuts the clip members 15 and 17, while neck 29 is adapted to be connected to receive water in a passage 79. Passage 79 also extends through flange 27 and stem 25 to convey water to water cavity 41. It should be noted that end 81 is spaced from ends 77 of the conductor bar, so that water fills a portion of the water cavity 41. Further, it should be noted that water inlet member 23 is brazed to clip members 15 and 17.

After conductor bar 31, and the appropriate shims of brazing material have been positioned in one of the clip members as illustrated in FIG. 4, the other clip member is positioned adjacent the first clip member and heat is applied to raise the temperature of all components to the melting temperature of the brazing material. At this time, clip members 15 and 17 are hydraulically forced toward one another to compress the brazing material and conductor bar 31. As clip member 15 and 17 are hydraulically forced toward one another, the brazing material spreads uniformly throughout the assembly and collects in little pools or reservoirs at the larger gaps or spaces, such as at the rounded corners of the conductors 33. Thus, a very strong, uniform and nonporous braze joint is relatively simply produced.

When the clip members have been joined, the stem 25 of the water inlet member 23 is inserted into the water cavity 41 and the inlet member 23 is brazed to clip members 15 and 17.

Turning now to FIG. 6, the completion of an end turn of a turbogenerator is illustrated. This is achieved by utilizing a connection 11 on the end of each connector bar 31 that is to be connected through the end turn. By having the slightly longer leg 19 of one connection 11 abut the slightly shorter leg 21 of the other, the two connections are properly aligned and positioned. Series connection pads 85 and 87 may then be brazed to the outer surface of the legs to form a permanent joint. The brazing material utilized for this joint should have a lower melting temperature than that employed for the shims, strips and bands in the conductor bar receiving chamber, in order to prevent any interference with that brazed joint. An example of such a lower temperature brazing alloy is that sold under the trademark "EASI-FLO 45", a compound which includes a higher percentage of silver.

It should be understood that various modifications, changes and variations may be made in the arrangement, operation and details of construction of the elements disclosed herein without departing from the spirit and scope of this invention.

I claim:

1. A method of forming an electrical and hydraulic connection for a conductor bar having a plurality of hollow water-cooled conductors comprising the steps:
producing mating connector clip members that form a conductor bar receiving chamber and a larger water cavity therebetween when placed together;
inserting strips of brazing material between adjacent hollow conductors in the conductor bar;
adjusting the cross-sectional length of the conductor bar to fit snuggly in conductor bar receiving chamber portions of said clip members;
placing a band of brazing material in said conductor bar receiving chamber portions of each of said clip members, said bands of brazing material being sufficiently thick to insure that the cross-sectional width of the conductor bar added to the thickness of said bands is greater than the width of said conductor bar receiving chamber;
locating the conductor bar between said clip members in said conductor bar receiving chamber portions thereof;
heating said clip members and the conductor bar to the melting temperature of said strips and bands of brazing material;
forcing said clip members together with the conductor bar therebetween until said clip members are brought into contact with one another; and
preventing brazing material from building up in the open ends of the hollow conductors of the conductor bar.

2. A method as claimed in claim 1 wherein said step of forcing said clip members together comprises hydraulically compressing the conductor bar and the strips and bands of brazing material between said clip members.

3. A method as claimed in claim 1 and further comprising the step of securing said clip members to prevent relative motion therebetween, while not interfering with displacement of said clip members toward one another, during said step of forcing said clip members together.

4. A method as claimed in claim 1 wherein said step of preventing brazing material from entering into the open ends of the hollow conductors of the conductor bar comprises:
extending the ends of said hollow conductors slightly beyond said conductor bar receiving chamber into said water cavity; and
passing air through the hollow conductors to blow out any brazing material that begins to flow into the open end of the hollow conductors.

5. A method as claimed in claim 1 wherein said step of adjusting the cross-sectional length of the conductor bar comprises placing a packing shim of conductive material having an appropriate thickness between a pair of hollow conductors.

6. A method as claimed in claim 1 wherein the hollow conductors are positioned in adjacent parallel rows separated by a web of conductive material and further comprising the step of placing additional bands of brazing material on either side of said web of conductive material, the thickness of said additional bands being added to the thickness of said bands of brazing material and the cross-sectional width of the conductor bar in determining a total dimension greater than the width of said conductor bar receiving chamber.

7. A method as claimed in claim 1 and further comprising the steps:
inserting a water inlet member into said water cavity after said clip members have been forced together; and
brazing said water inlet member to said clip members to thus provide for the insertion of water into said water cavity.

8. A method of forming an electrical and hydraulic connection for a conductor bar having a plurality of hollow water-cooled conductors arranged in two parallel rows separated by a web of conductive material comprising the steps:

producing mating connector clip members that form therebetween when placed together a conductor bar receiving chamber at one end and a larger water cavity at the other end;

inserting strips of brazing material between adjacent hollow conductors in the conductor bars;

placing a packing shim of an appropriate thickness in each of said rows of hollow conductors to adjust the cross-sectional length of the conductor bar in order to have it fit snuggly in said conductor bar receiving chamber;

placing a band of brazing material in a conductor bar receiving chamber portion in each of said clip members and on each side of said web of conductive material, said bands of brazing material being sufficiently thick to insure that the cross-sectional width of the conductor bar added to the thickness of said bands is greater than the width of said conductor bar receiving chamber;

locating the conductor bar between said clip members in said conductor bar receiving chamber portions thereof with the conductor bar extending partially into said water cavity;

passing a pair of dowels formed of conductive material through appropriate openings provided in said clip members to prevent relative motion between said clip members without interfering with displacement of said clip members toward one another;

heating said clip members and the conductor bar to the melting temperature of said strips and bands of brazing material;

hydraulically compressing the conductor bar and said strips and bands of brazing material between said clip members until said clip members are brought into contact with one another to braze the hollow conductors to one another and to said clip members and said web;

passing air through the hollow conductors to blow out any brazing material that begins to flow into the open ends of the hollow conductors;

inserting a water inlet member into said water cavity from the open end thereof, the inserted end of said water inlet member being spaced from the opposed end of said conductor bar; and brazing said water inlet member to said clip members.

* * * * *